United States Patent
Krahn et al.

(10) Patent No.: US 9,512,838 B2
(45) Date of Patent: Dec. 6, 2016

(54) TORQUE-GENERATING STEERING DEVICE

(71) Applicant: Eaton Corporation, Cleveland, OH (US)

(72) Inventors: Aaron Kelly Krahn, Eden Prairie, MN (US); Vance Richard Murray, Eden Prairie, MN (US)

(73) Assignee: Eaton Corporation, Cleveland, OH (US)

(*) Notice: Subject to any disclaimer, the term of this patent is extended or adjusted under 35 U.S.C. 154(b) by 303 days.

(21) Appl. No.: 14/203,851

(22) Filed: Mar. 11, 2014

(65) Prior Publication Data

US 2014/0271309 A1 Sep. 18, 2014

Related U.S. Application Data

(60) Provisional application No. 61/794,902, filed on Mar. 15, 2013.

(51) Int. Cl.

| | |
|---|---|
| *B62D 5/083* | (2006.01) |
| *F04C 2/10* | (2006.01) |
| *B62D 5/14* | (2006.01) |
| *F01C 1/10* | (2006.01) |
| *F01C 21/00* | (2006.01) |
| *F04C 15/00* | (2006.01) |

(52) U.S. Cl.
CPC .............. *F04C 2/106* (2013.01); *B62D 5/083* (2013.01); *B62D 5/14* (2013.01); *F01C 1/105* (2013.01); *F01C 21/008* (2013.01); *F04C 2/104* (2013.01); *F04C 15/0073* (2013.01)

(58) Field of Classification Search
CPC .................................. B62D 5/083; F04C 2/113
See application file for complete search history.

(56) References Cited

U.S. PATENT DOCUMENTS

| | | |
|---|---|---|
| RE25,291 E | 12/1962 | Charlson |
| 3,360,932 A | 1/1968 | Lech et al. |
| 3,591,320 A * | 7/1971 | Woodling ............... F04C 2/104 418/61.3 |
| 4,169,515 A | 10/1979 | Presley |
| 4,552,519 A | 11/1985 | White, Jr. |
| 4,905,782 A | 3/1990 | Rieger et al. |
| 4,936,094 A | 6/1990 | Novacek |
| 5,404,722 A | 4/1995 | Nagao et al. |
| 5,873,243 A | 2/1999 | Uppal et al. |
| 6,575,263 B2 | 6/2003 | Hjelsand et al. |

FOREIGN PATENT DOCUMENTS

| | | |
|---|---|---|
| DE | 35 04 993 A1 | 8/1986 |
| DE | 36 34 215 A1 | 4/1987 |
| DE | 197 40 352 A1 | 3/1999 |

(Continued)

OTHER PUBLICATIONS

International Search Report and Written Opinion for PCT/US2014/024909 mailed Jul. 4, 2014.

(Continued)

*Primary Examiner* — F. Daniel Lopez
(74) *Attorney, Agent, or Firm* — Merchant & Gould, P.C.

(57) ABSTRACT

A torque generator is disclosed. The torque generator includes a valve arrangement including a spool valve and a valve sleeve. A torsion bar biases the valve arrangement toward a neutral position.

14 Claims, 9 Drawing Sheets

(56) References Cited

FOREIGN PATENT DOCUMENTS

| DE | 198 53 142 A1 | 5/2000 |
|----|---------------|--------|
| FR | 2 447 844 A1  | 8/1980 |
| GB | 2 048 187 A   | 12/1980 |
| GB | 2 306 927 A   | 5/1997 |

OTHER PUBLICATIONS

TRW, Ross Gear Fluid Power Products, Date Unknown, 16 pages.
Eaton Corporation, Torque Generator Parts Information, Nov. 1996, 8 pages.

\* cited by examiner

TORQUE-GENERATING STEERING DEVICE

CROSS REFERENCE TO RELATED APPLICATIONS

This application claims priority to U.S. provisional application no. 61/794,902, filed Mar. 15, 2013, the disclosure of which is herein incorporated by reference in its entirety.

TECHNICAL FIELD

The present disclosure relates generally to steering control devices for use in vehicles.

BACKGROUND

Torque generators have been in commercial use for many years. A typical torque generator is capable of translating a relatively low-torque input into a relatively high-torque steering output with the aid of a source of pressurized fluid. Example torque generators are disclosed by U.S. Pat. No. RE 25,291 and U.S. Pat. No. 4,936,094.

Known torque generators can include a valve arrangement including a spool that extends through a sleeve. The spool and the sleeve are coaxially aligned along an axis, and a limited range of relative rotational movement about the axis is permitted between the spool and the sleeve. The valve arrangement is normally biased toward a neutral state (i.e., position, configuration, etc.). The valve arrangement is displaced from the neutral state to an operating state by rotation of a steering wheel coupled to the spool. When the valve arrangement is in the operating state, pressurized fluid flows through the valve arrangement and into a fluid pressure actuated displacement mechanism, such as a gerotor gear set, thereby generating a relatively high-torque steering output which is transmitted through an output shaft to a steering apparatus, such as the pinion gear of a rack and pinion device. While torque generators are particularly advantageous when used in vehicle steering systems, and will be described in connection therewith, it will be appreciated that torque generators can also be used in various other applications.

SUMMARY

One aspect of the present disclosure relates to a torque generator having an integrated torsion bar that in operation provides the torque generator with an "on-highway" type feel.

Another aspect of the present disclosure relates to a torque generator having a valve arrangement including a spool valve and a valve sleeve aligned along an axis of rotation. The spool valve includes an input shaft. The valve sleeve is positioned over and co-axially aligned with the spool valve. Relative rotational movement between the valve sleeve and the spool valve about the axis of rotation allows the valve arrangement to move between a neutral state and an operating state. The torque generator also has a gerotor displacement mechanism including a stator and a rotor. When the valve arrangement is in the operating state, the valve arrangement is adapted to provide pressurized fluid to the gerotor displacement mechanism for driving the rotor relative to the stator. The torque generator also has an output shaft coupled to the rotor and a torsion bar that extends axially through an interior of the spool valve along the axis of rotation. In addition, the torque generator has a first cross-shaft that rotationally fixes the torsion bar relative to the spool valve at a first axial location of the torsion bar. Furthermore, the torque generator has a second cross-shaft that rotationally fixes the torsion bar relative to the valve sleeve at a second axial location of the torsion bar. The first and second axial locations are axially spaced-apart from one another. The torsion bar is configured such that when the valve arrangement is moved toward the operating state by generating relative rotational movement between the spool valve and the valve sleeve, torque is applied to the torsion bar such that the torsion bar elastically twists about the axis of rotation causing a torsion load to be stored within the torsion bar between the first and second axial locations of the torsion bar. The torsion load rotationally biases the valve arrangement toward the neutral state. The torque generator also has a torque driver that transfers torque from the rotor to the second cross-shaft for causing the valve sleeve to follow rotation of the spool valve when the valve arrangement operates in the operating state.

Another aspect of the present disclosure relates to a valve arrangement having a spool valve and a valve sleeve positioned over the spool valve. Relative rotational movement between the valve sleeve and the spool valve allows the valve arrangement to move between a neutral state and an operating state. The valve arrangement also has a torsion bar for biasing the valve arrangement toward the neutral state. The torsion bar is rotationally coupled to the spool valve at a first axial location of the torsion bar. The torsion bar is rotationally coupled to the valve sleeve at a second axial location of the torsion bar. When the valve arrangement is moved toward the operating state by generating relative rotational movement between the spool valve and the valve sleeve, torque is applied to the torsion bar such that the torsion bar elastically twists causing a torsion load to be stored within the torsion bar between the first and second axial locations of the torsion bar. The torsion load rotationally biases the valve arrangement toward the neutral state.

Still another aspect of the present disclosure relates to a method for operating a valve arrangement including a spool valve positioned within a valve sleeve. The spool valve and the valve sleeve are configured such that relative rotation between the spool valve and the valve sleeve allows the valve arrangement to be moved between a neutral state and an operating state. The method for operating includes moving the valve arrangement from the neutral position toward the operating state by generating relative rotation between the spool valve and the valve sleeve. The method for operating also includes applying torque to a torsion bar as the valve arrangement is moved from the neutral state toward the operating state. Furthermore, the method for operating includes storing at least some of the torque as torsion load within the torsion bar, and biasing the valve arrangement toward the neutral state with the stored torsion load.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the examples disclosed herein are based.

DETAILED DESCRIPTION

Figure 1:
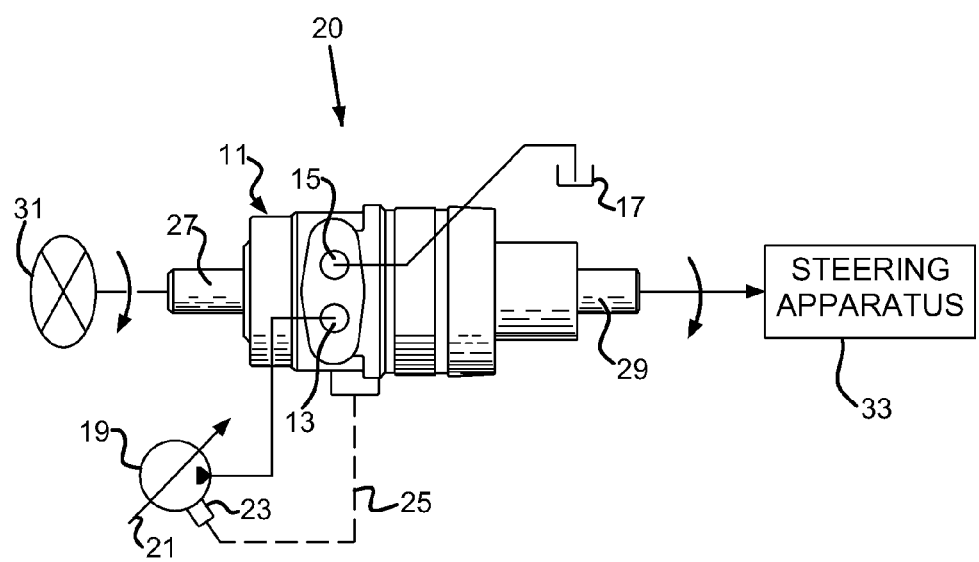
FIG. 1 is a schematic view of a torque generator in accordance with the principles of the present disclosure.

FIG. 1 illustrates somewhat schematically a hydraulic steering system 20 including a torque-generating steering device, normally designated 11 and referred to herein simply as a "torque generator." The torque generator 11 defines an inlet port 13 and an outlet port 15. The outlet port 15 is in fluid communication with a system reservoir 17. The inlet port 13 is in a fluid communication with the outlet port of a hydraulic pump 19 (e.g., a variable displacement hydraulic pump). In one example, the hydraulic pump 19 can include a swash plate 21, the position of which can be modified to vary the amount of fluid the pump displaces for each rotation of the pump. The position of the swash plate 21 can be determined by a flow and pressure compensator, schematically designated as 23, which receives a load pressure signal 25 from the torque generator 11.

Figure 11:
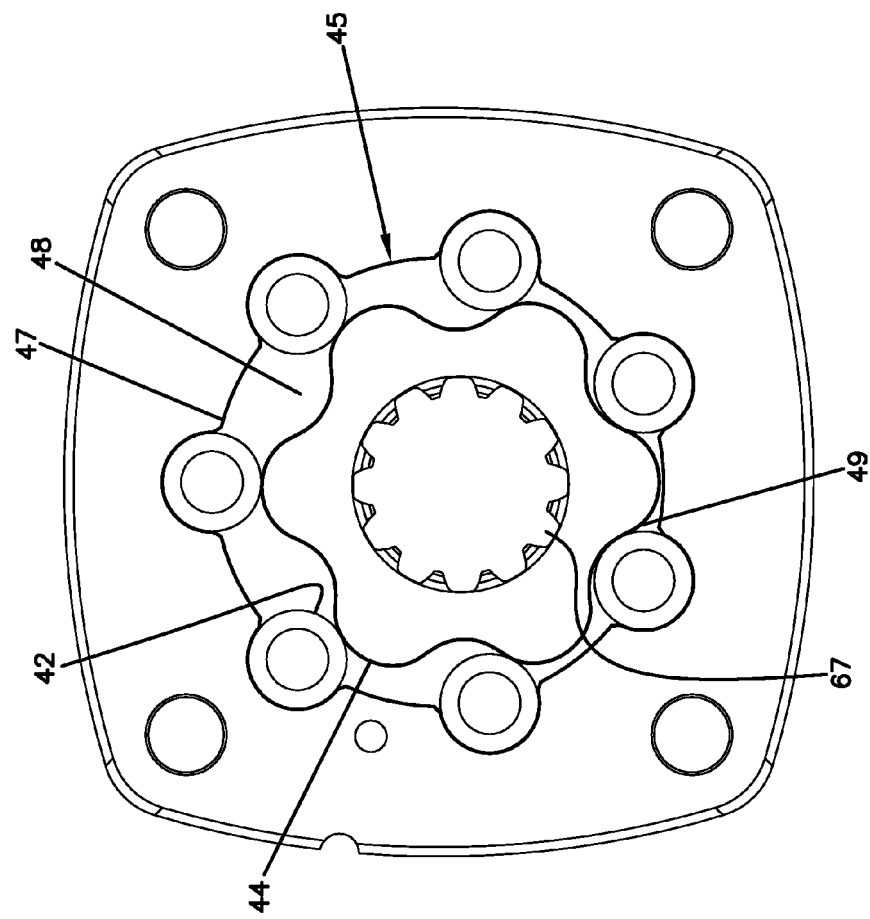
FIG. 11 is a cross-sectional view through a gerotor displacement mechanism of the torque generator of FIGS. 2 and 3.

The torque generator 11 includes an input shaft 27 and an output shaft 29. Operably connected to the input shaft 27 is a steering wheel 31 of a vehicle. In one example, relatively low-torque input is transmitted to the torque generator 11 from the steering wheel 31. In a preferred example, the torque generator 11 receives the relatively low-torque input, and converts the low-torque input into a relatively high-torque steering output. The relatively high-torque steering output can be transmitted through the output shaft 29 to any suitable device. In one example, the output shaft 29 transfers the relatively high-torque steering output to a pinion gear of a rack and pinion steering apparatus 33. In one example, the relatively high-torque output can be generated by a hydraulic motor such as a gerotor displacement mechanism 45 (see FIG. 11). The gerotor displacement mechanism 45 can include a ring structure 47 (i.e., a stator) and an externally-toothed star member 49 (e.g., a rotor). As is well known to those skilled in the art, but by way of example only, the ring structure 47 has N+1 internal projections 42, and the star member 49 is eccentrically disposed within the ring structure 47 and has N external teeth 44. The star member 49 orbits and rotates within the ring structure 47. This relative orbital end rotational motion creates a plurality of expanding and contracting fluid volume chambers 48 defined between the ring structure 47 and the star member 49. The internal projections 42 of the ring structure 47 can include rollers that reduce friction between the ring structure 47 and the star member 49 as the star member 49 rotates and orbits within the ring structure 47.

Figure 2:
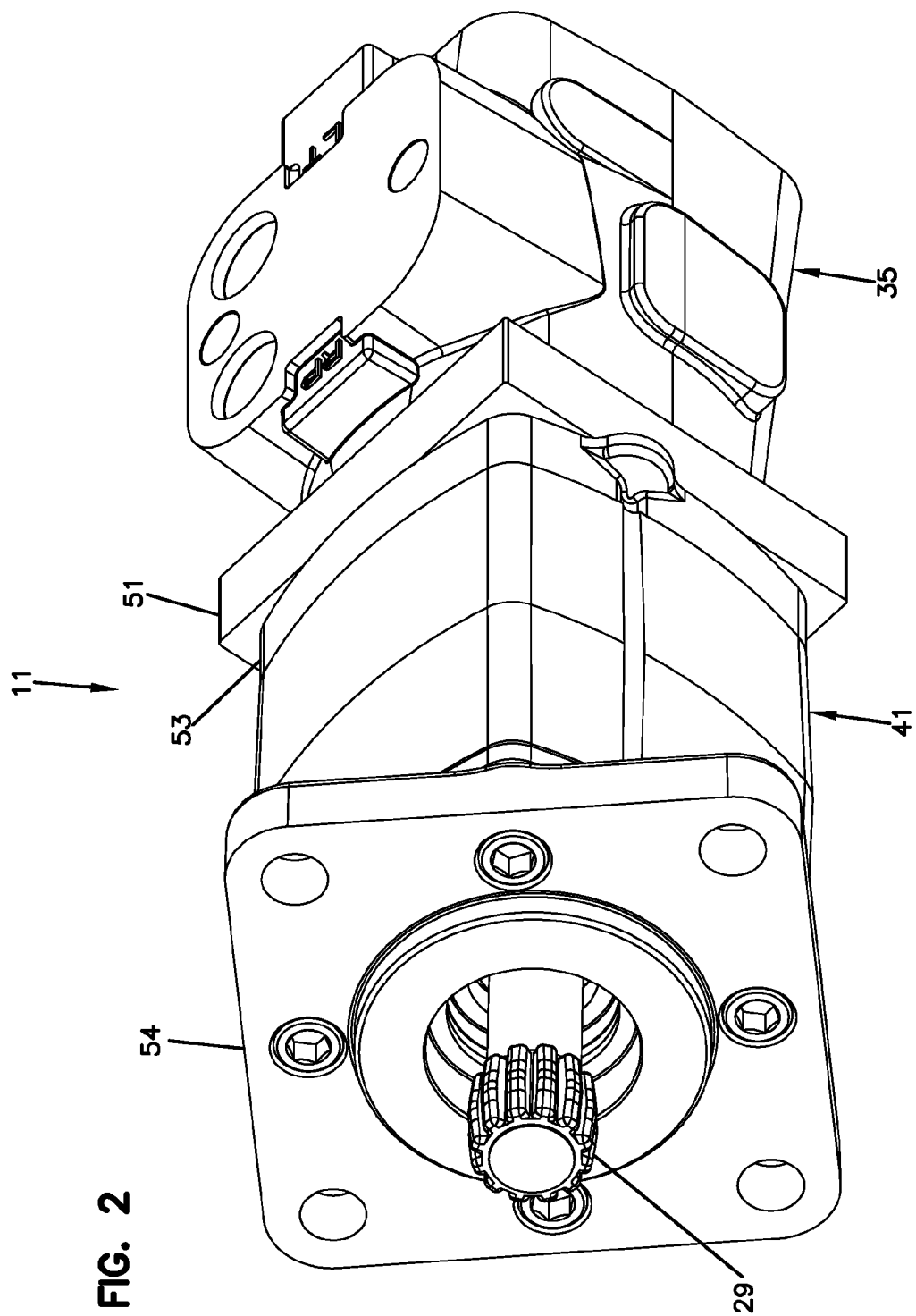
FIG. 2 is a perspective view of a torque generator in accordance with the principles of the present disclosure.
Figure 3:
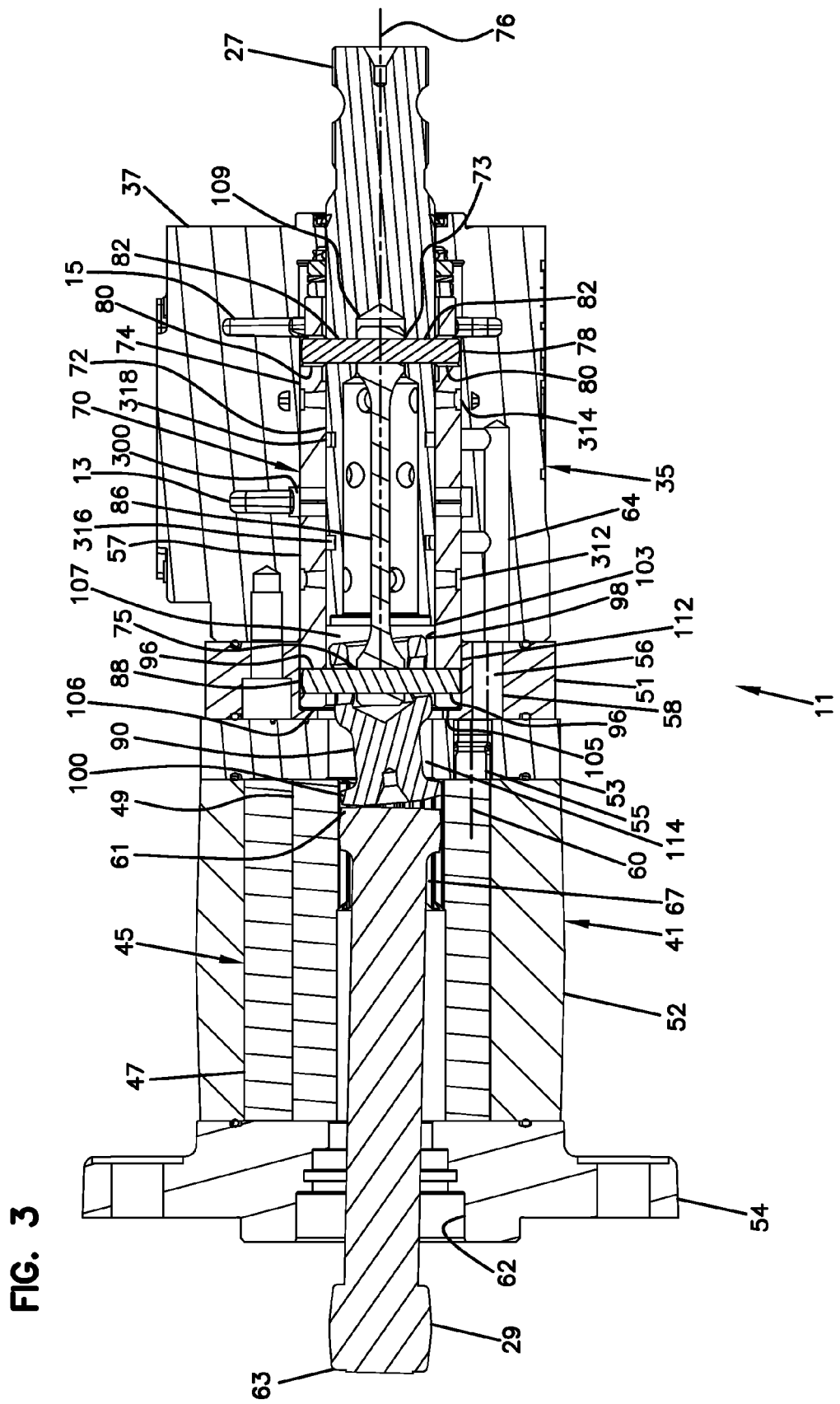
FIG. 3 is a longitudinal cross-sectional view of the torque generator of FIG. 2.

Referring to FIGS. 2 and 3, the torque generator includes a plurality of sections held in sealing engagement by a plurality of fasteners such as bolts or other fasteners. The torque generator 11 includes a valve housing 35, a motor housing 41, an adapter plate 51 and a port plate 53. The motor housing 41 includes a motor sleeve 52 and an end plate 54. The ring structure 47 and the star member 49 are housed within the motor sleeve 52 and the output shaft 29 is coupled to the star member 49 and projects outwardly from the end plate 54. The valve housing 35 includes an end face 37 from which the input shaft 27 projects. The adapter plate 51 is fastened to the valve housing 35 and the port plate 53 is secured between the adapter plate 51 and the sleeve 52 of the motor housing 41. The port plate 53 defines fluid ports 55 corresponding to each of the chambers 48 of the gerotor displacement mechanism 45. The adapter plate 51 defines ports 56 that overlap and are in fluid communication with the ports 55. Centerlines 58 of the ports 56 are radially outwardly offset from centerlines 60 of the ports 55. The centerlines 58, 60 are parallel to one another and are also parallel to a central axis 76 defined by a main valve bore 57 of the valve housing 35. The valve housing 35 defines passages 64 that provide fluid communication between the ports 56 and the main valve bore 57. The end plate 54 and the port plate 53 are positioned at opposite axial ends of the motor sleeve 52.

The end plate 54 defines a central opening 62 through which the output shaft 29 extends. The output shaft 29 includes a first end 61 and a second end 63. The first end 61 is connected to the star member 49 by a connection that allows torque to be transferred from the star member 49 to the output shaft 29. The second end 63 extends outwardly from the end plate 54 and is adapted for connection to the steering apparatus 33. In one example, the first end 61 of the output shaft 29 includes a set of crowned external splines 65 that engage a set of internal splines 67 defined within the star member 49.

Figure 4:
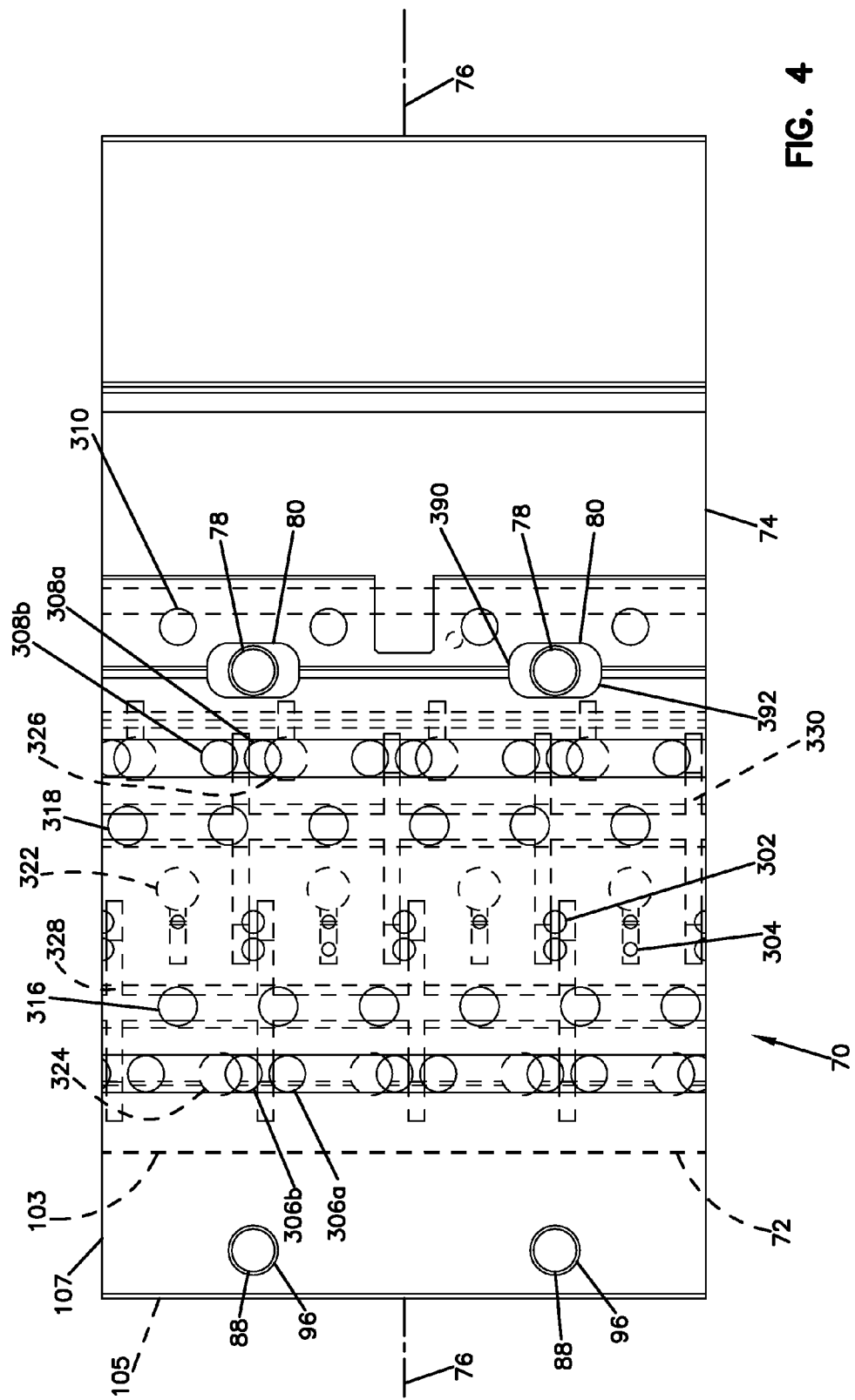
FIG. 4 is a flat pattern overlay of the spool and sleeve of a valve arrangement of the torque generator of FIGS. 2 and 3, the valve arrangement is shown in a neutral state.

The torque generator 11 also includes a valve arrangement 70 housed within the main valve bore 57 of the valve housing 35. The valve arrangement 70 includes a spool valve 72 positioned within a valve sleeve 74. The spool valve 72 includes the input shaft 27. The spool valve 72 and the valve sleeve 74 are depicted as being coaxially aligned with the axis 76. The spool valve 72 and the valve sleeve 74 are configured to rotate about the axis 76. In one example, a limited range of relative rotational movement is permitted about the axis 76 between the spool valve 72 and the valve sleeve 74. For example, the spool valve 72 and the valve sleeve 74 can be connected by a first cross-shaft 78. As shown at FIG. 4, the valve sleeve 74 can have oversized holes 80 for receiving the cross-shaft 78. The oversized holes 80 can be elongated in a circumferential direction about the axis 76. The spool valve 72 can also define openings 82 for receiving the cross-shaft 78. In one example, the openings 82 have a clearance fit with respect to the first cross-shaft 78. The oversized configuration of the openings 80 allows for a limited range of relative rotation (e.g., 10 degrees) between the spool valve 72 and the valve sleeve 74 about the axis 76. For example, the spool valve 72 and the valve sleeve 74 can be relatively moved from a neutral state (see FIG. 4) to a right operating state (see FIG. 5). The spool valve 72 and the valve sleeve 74 can also be relatively moved from the neutral state of FIG. 4 to a left operating state (see FIG. 6). A torsion bar 86 can be used to bias the valve arrangement 70 toward the neutral state.

Figure 7:
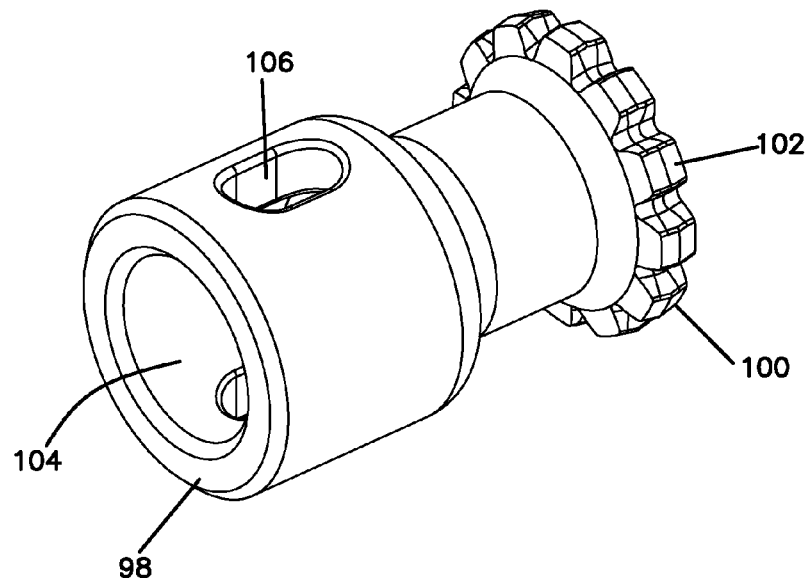
FIG. 7 is a perspective view of a torque drive of the torque generator of FIGS. 2 and 3.
Figure 8:
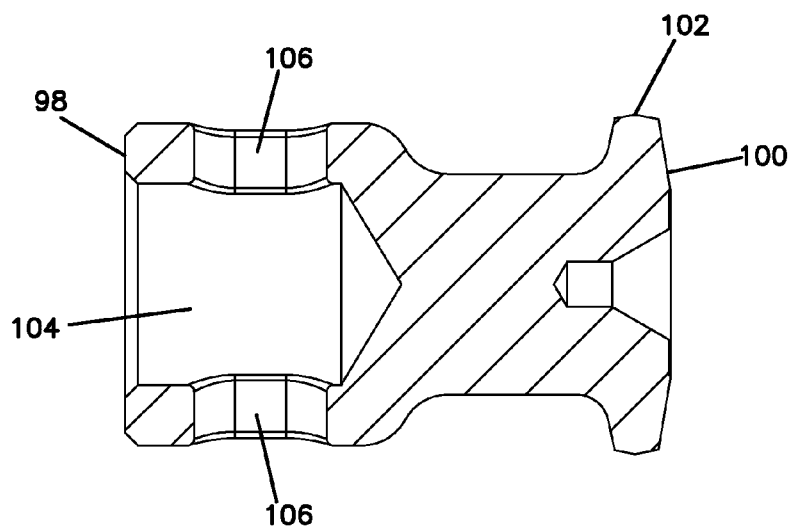
FIG. 8 is a cross-sectional view of the torque drive of FIG. 7.

The torque generator 11 further includes a torque transfer arrangement for transferring torque from the star member 49 to the valve sleeve 74. The torque transfer arrangement includes a second cross-shaft 88 and a torque driver 90. The second cross-shaft 88 is coupled to the valve sleeve 74. For example, ends of the second-cross-pin 88 are received within openings 96 defined by the valve sleeve 74. In one example, the ends of the second cross-shaft 88 have a clearance fit within the openings 96. The torque driver 90 is configured for transferring torque from the star member 49 to the second cross-shaft 88. The torque driver 90 includes a first end 98 and an opposite second end 100. As shown at FIGS. 7 and 8, the first end 98 includes a sleeve 104 that defines openings 106 through which the second cross-pin 88 extends. In this way, a torque-transmitting relationship exists between the sleeve 104 and the second cross-pin 88. In one example, the opening 106 is oversized in an axial direction to accommodate pivotal/orbital movement of the torque driver 90 caused as the second end 100 of the torque driver 90 orbits with the star member 49. The second end 100 of the torque driver 90 can includes a set of crowned, external splines 102 that engage the internal splines 67 of the star member 49 such that torque can be transferred from the star member 49 to the torque driver 90.

The torsion bar 86 extends axially through an interior of the spool valve 72 along the axis of rotation 76. The first cross-shaft 78 rotationally fixes the torsion bar 86 relative to the spool valve 72 at a first axial location 73 of the torsion bar 86. The second cross-shaft 88 rotationally fixes the torsion bar 86 relative to the valve sleeve 74 at a second axial location 75 of the torsion bar 86. The first and second axial locations 73, 75 are axially spaced-apart from one another. The torsion bar 86 is configured such that when the valve arrangement 70 is moved to the operating state by generating relative rotational movement between the spool valve 72 and the valve sleeve 74, torque is applied to the torsion bar 86 such that the torsion bar elastically twists about the axis of rotation 76 causing a torsion load to be stored within the torsion bar 86 between the first and second axial locations 73, 75 of the torsion bar 86. The torsion load rotationally biases the valve arrangement 70 toward the neutral state of FIG. 4.

Figure 9:
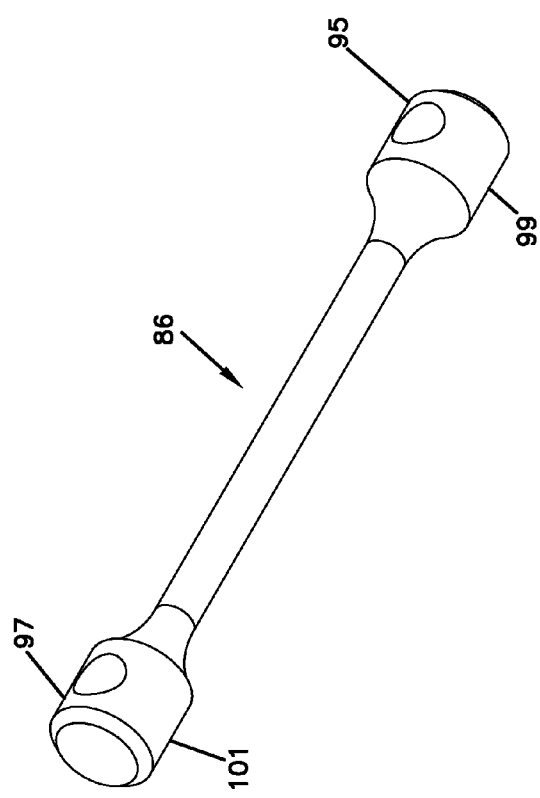
FIG. 9 is a perspective view of a torsion bar of the torque generator of FIGS. 2 and 3.
Figure 10:
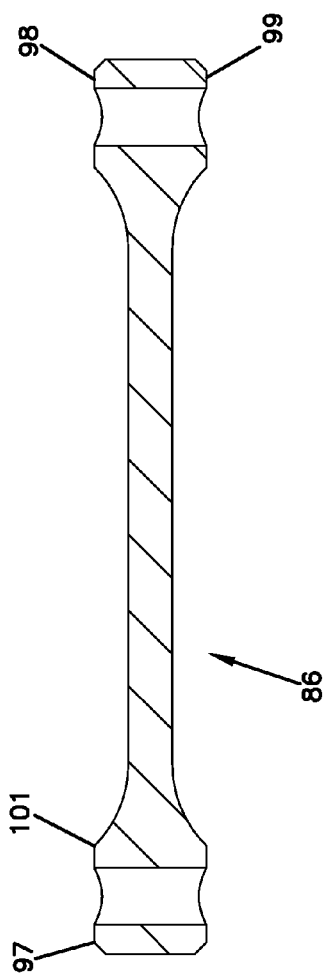
FIG. 10 is a cross-sectional view of the torsion bar of FIG. 9.

As shown at FIGS. 9 and 10, the torsion bar 86 includes first and second ends 95, 97 respectively defining first and second enlarged heads 99, 101. The heads 99, 101 are separated by a linear, intermediate portion of the torsion bar which has a reduced diameter as compared to the heads 99, 101. The first and second enlarged heads 99, 101 respectively correspond to the first and second axial locations 73, 75. The first cross-shaft 78 extends through the first enlarged head 99 and the second cross-shaft 88 extends though the second enlarged head 101. A clearance fit can exist between the cross-shafts 78, 88 and their corresponding enlarged heads 99, 101.

Referring to FIG. 4, an end 103 of the spool valve 72 is recessed relative to a corresponding end 105 of the valve sleeve 74 such that a non-overlapping region 107 is defined at the end 105 of the valve sleeve 74. The non-overlapping region 107 provides a pocket or enlarged region for accommodating the second axial location 75 of the torsion bar 86. The second cross-shaft 88 engages the valve sleeve 74 at the non-overlapping region 107. Also, the sleeve 104 of the torque driver 90 is positioned at the non-overlapping region 107. The sleeve 104 receives the second enlarged head 101 of the torsion bar 86. The first enlarged head 99 fits within a pocket 109 defined by the input shaft 27.

The adapter plate 51 defines a central opening 112 that receives the end 105 of the valve sleeve 74. The port plate 53 defines a central opening 114 through which the torque driver 90 extends. The central opening 112 is larger than the central opening 114. The outward radial offset of the ports 56 provides more space for accommodating the sleeve 74.

The torsion bar 86 is depicted as a straight rod that is capable of twisting along its central longitudinal axis when torque is applied to the torsion bar about the central longitudinal axis. As the torsion bar twists upon the application of torque, the torsion bar stores potential energy in the form of a torsion load. The torsion bar can be hollow or solid. In one example, the torsion bar is made of a material having elastic properties such as a metal material (e.g., stainless steel, spring steel or other materials).

The gerotor displacement mechanism 45 can provide two primary functions. The first function of the gerotor displacement mechanism 45 is to serve as a fluid meter, in response to the flow of pressurized fluid therethrough, to provide follow-up movement of the valve sleeve 74 relative to the spool valve 72. To accomplish this follow-up function, torque is transmitted from the star member 49 to the valve sleeve 74 through the torque driver 90 and the second cross-pin 88 to cause the valve sleeve 74 to follow the spool valve 72 as the spool valve 72 is rotated about the axis 76. The second function of the gerotor displacement mechanism 45 is to transmit a high-torque output to the output shaft 29. This function is made possible by the splined connection between the output shaft 29 and the star member 49.

In use, the valve arrangement 70 is normally in the neutral position of FIG. 4. In the neutral position, the gerotor displacement mechanism 45 is not driven. When the steering wheel 31 is manually turned, the spool valve 72 rotates relative to the valve sleeve 74 from the neutral position toward an operating position (e.g., a left operating position or a right operating position depending upon the direction the steering wheel is rotated). In the operating position, the valve arrangement 70 provides fluid communication between the inlet port 13 and the fluid ports 55 such that fluid pressure from the hydraulic pump 19 causes the star member 49 to rotate and orbit within the ring structure 47. Movement of the star member 49 causes torque to be applied to the output shaft 29 and also causes torque to be applied to the valve sleeve 74 causing the valve sleeve 74 to follow the spool valve 72 as the spool valve 72 is rotated about the axis 76. The valve arrangement 70 also provides fluid communication between the fluid ports 55 and the system reservoir 17 such that hydraulic fluid exhausted from the gerotor displacement mechanism 45 flows through the valve arrangement 70 and out the outlet port 15 to the system reservoir 17. In this way, hydraulic fluid from the hydraulic pump 19 fills the fluid volume chambers of the gerotor displacement mechanism 45 as the fluid volume chambers 48 expand and hydraulic fluid within the fluid volume chambers 48 is returned to the system reservoir 17 as the fluid volume chambers 48 contract.

Figure 5:
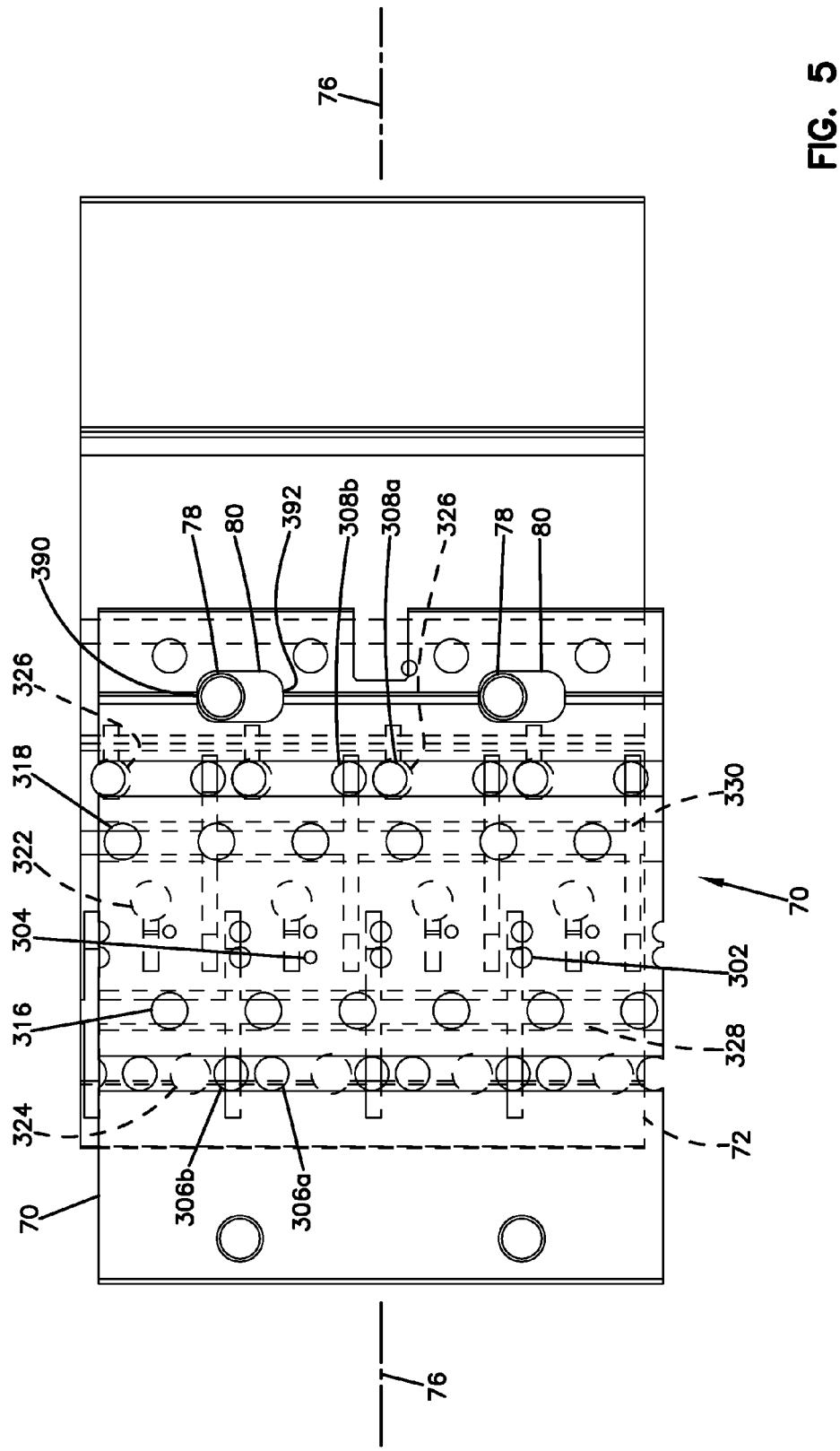
FIG. 5 shows the flat pattern overlay of FIG. 4 in a right, operating state.
Figure 6:
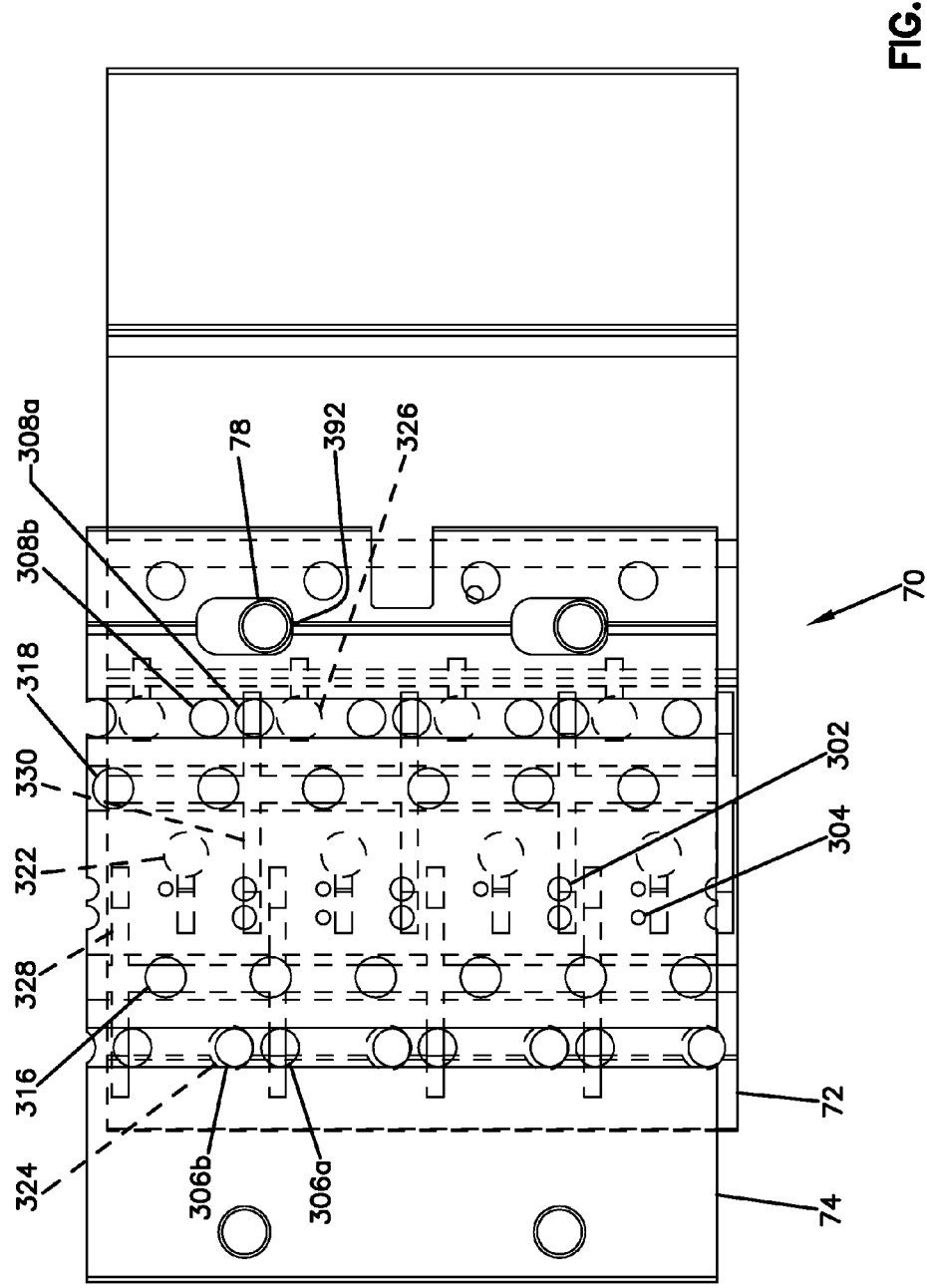
FIG. 6 shows the flat pattern overlay of FIG. 4 in a left, operating state.

As used herein, "operating state" means a state where sufficient pressurized flow passes through the valve arrangement 70 to drive movement of the gerotor displacement mechanism (or other motor type). When relative rotation is first generated between the spool valve 72 and the valve sleeve 74, the valve arrangement 70 initially passes through a "dead band" (typically a degree or so) where insufficient flow passes through the valve arrangement 70 to drive the displacement mechanism 45. Once the valve arrangement 70 rotates past the "dead zone", the valve arrangement 70 is in the operating state where sufficient flow passes through the valve arrangement 70 to drive movement of the star member 49 thereby causing torque to be output from the output shaft 29 and also causing the valve sleeve 74 to follow rotation of the spool valve 72. FIG. 5 shows the valve arrangement 70 at a maximum right rotational displacement (i.e., a maximum right rotational displacement between the spool valve 72 and the valve sleeve 74) of the right operating state. FIG. 6 shows the valve arrangement 70 at a maximum left rotational displacement (i.e., a maximum left rotational displacement between the spool valve 72 and the valve sleeve 74) of the left operating state.

The torsion bar 86 functions to bias the spool valve 72 and the valve sleeve 74 toward the neutral position of FIG. 4. In this regard, the second cross-shaft 88 is rotationally fixed relative to the valve sleeve 74 (i.e., the second cross-pin 88 is not free to rotate relative to the valve sleeve 74) while the oversized holes 80 that receive the ends of the first cross-shaft 78 allow the first cross-shaft 78 to rotate a limited amount (e.g., ten degrees) relative to the valve sleeve 74. When the steering wheel 31 is used to turn the input shaft 27 about the axis 76 relative to the valve sleeve 74, the first cross-shaft 78 transfers torque to the torsion bar 86 causing the torsion bar to twist about the axis 76 as the input shaft 27 rotates and the ends of the first cross-shaft 78 slide along the oversized holes 80. While the valve arrangement 70 is in the dead band state, the second cross-shaft 88 engages the torque driver 90 such that the second end of the torsion bar 86 and the valve sleeve 74 are prevented from rotating about the axis 76. This occurs because when the valve arrangement 70 is in the neutral or dead band state, fluid cannot flow readily through the gerotor displacement mechanism 45 and the star member 49 is essentially hydraulically locked. Thus, since the torque driver 90 is coupled to the star member 49, the force required to rotate the torque driver 90 is substantially larger than the force required to elastically twist the torsion bar 86. In this way, the second end 97 is rotationally fixed and initial rotation of the input shaft 27 applies a torsional load to the torsion bar 86. The torsion bar 86 elastically twists to absorb the load. Upon release of the load, the torsion bar will cause the valve arrangement 70 to move back to the neutral state of FIG. 4. It has been determined that the use of a torsion bar 86 between the first and second cross-shafts 78, 88 provides the hydraulic steering system 20 with an "on-highway" feel.

As described above, the torsion bar 86 is configured to elastically absorb potential energy in the form of a torsion load as the input shaft 27 rotates relative to the valve sleeve 74 thereby placing the spool valve 72 and the valve sleeve 74 in an operating state. In the operating state, fluid pressure from the hydraulic pump 19 flows through the valve arrangement 70 to the gerotor displacement mechanism 45 thereby driving rotational and orbital movement up of the star member 49 relative to the ring structure 47. As the star member 49 rotates and orbits, the output shaft 29 is rotated to generate an output torque. Concurrently, the torque driver 90 and the second cross-shaft 88 apply torque to the valve sleeve 74 causing the valve sleeve 74 to follow rotation of the spool valve 72.

Referring to FIG. 4, the valve sleeve 74 includes pressure ports 302 and return ports 304 that are in fluid communication with an annular recess 300 defined by the valve housing 35 within the main valve bore 57. The annular recess 300 is in fluid communication with the inlet port 13. The valve sleeve 74 further includes reservoir port 306a, 306b, reservoir ports 308a, 308b, and reservoir ports 310.

The reservoir ports 306a, 306b are fluidly connected to one another by an outer circumferential groove 312 defined by the valve sleeve 74. Similarly, the reservoir ports 308a, 308b are fluidly connected to one another by a circumferential groove 314 defined within the outer surface of the valve sleeve 74. The valve sleeve 74 further includes metering ports 316 and metering ports 318. The metering ports 316, 318 are in fluid communication with the fluid ports 55. The valve housing 35 defines the passages 64 for fluidly connecting the metering ports 316, 318 to the fluid ports 56 and thus the fluid ports 55.

Referring still to FIG. 4, the spool valve 72 includes reservoir ports 322 corresponding to the reservoir ports 304, reservoir ports 324 corresponding to the reservoir ports 306a, 306b and reservoir ports 326 corresponding to the reservoir ports 308a, 308b. The reservoir ports 322, 324 and 326 are all in fluid communication with an interior of the spool valve 72. The spool valve 72 further includes a first passage arrangement 328 in fluid communication with the metering ports 316 and a second passage arrangement 330 in fluid communication with the metering ports 318.

Referring to FIG. 4, the valve arrangement 70 is shown in the neutral position. In the neutral position, the valve arrangement 70 has an open-center configuration. The cross-shaft 78 is centered between ends 390, 392 of the elongated holes 80. In this configuration, the pressure ports 302 are mainly blocked by the spool valve 72 and the reservoir ports 304 are aligned with the reservoir ports 322. In this configuration, pressurized fluid enters the valve arrangement 70 through the inlet port 13 and is directed to the annular recess 300. From the annular recess 300, flow proceeds through the reservoir ports 304 and 322 to the interior of the spool valve 72. Flow then proceeds through the interior of the spool valves 72 to reservoir ports 310. From the reservoir ports 310, the flow exits the valve arrangement 70 through the outlet port 15.

FIG. 5 illustrates the valve arrangement 70 in a right operating state in which the spool valve 72 has been rotated in a first rotational direction relative to the valve sleeve 74 so as to offset the valve arrangement 70 from the neutral state. As shown at FIG. 5, the first cross-shaft 78 is engaging the first ends 390 of the circumferentially elongated holes 80. When the valve arrangement 70 is moved to the right operating state of FIG. 5, the reservoir ports 304 are blocked and the pressure ports 302 are in fluid communication with the first passage arrangement 328. Also, reservoir ports 306a are blocked and reservoir ports 308a are aligned with reservoir ports 326. In this configuration, pressurized fluid from the pump 19 flows through the annular recess 300 and the pressure ports 302 into the first passage arrangement 328. From the first passage arrangement 328, flow proceeds through the metering ports 316 and the passages 64 as well as ports 56, 55 to the gerotor displacement mechanism 45 causing the star member 49 to rotate and orbit in the first rotational direction relative to ring structure 47. Exhaust flow returns to the valve arrangement 70 through the ports 55, 56 and the passages 64 and enters the second passage arrangement 330 through the metering ports 318. From the second passage arrangement 330, flow proceeds outwardly through the reservoir ports 308b to the circumferential groove 314. From the circumferential groove 314, flow enters the reservoir ports 308a and flows to the interior of the spool valve 72 through reservoir ports 326. The flow exits the interior of the spool valve 72 through the reservoir ports 310 and then exits the torque generator 11 through the outlet port 15.

FIG. 6 illustrates the valve arrangement 70 in a left operating position in which the spool valve 72 has been rotated in a second rotational direction relative to the valve sleeve 74 so as to offset the valve arrangement 70 from the neutral state. As shown at FIG. 6, the first cross-shaft 78 is engaging second ends 392 of the circumferentially elongated holes 80. In the position of FIG. 6, the reservoir ports 304 are offset from the reservoir ports 322 such that the reservoir ports 322 are blocked. Also, the reservoir ports 326 are offset from the reservoir ports 308a such that the reservoir ports 326 are blocked. Moreover, the pressure ports 302 are aligned with the second passage arrangement 330 and the reservoir ports 306b are aligned with reservoir ports 324. In this configuration, pressurized flow from the pump 19 flows from the annular recess 300 into the second passage arrangement 330 through the pressure ports 302. From the second passage arrangement 330, the pressurized flow exits the valve arrangement 70 through the metering ports 318 and flows to the gerotor displacement mechanism 45 through the passages 64 and ports 56, 55. The pressurized fluid then drives movement of the star member 49 in the second rotational and orbital direction relative to the ring structure 47. Exhaust flow from the gerotor displacement mechanism 45 returns to the valve arrangement 70 through the ports 55, 56 and the passages 64 and enters the first passage arrangement 328 through the metering ports 316. From the first passage arrangement 328, flow proceeds through reservoir ports 306a to the circumferential groove 312. From the circumferential groove 312, flow proceeds through reservoir ports 306b to reservoir ports 324. Reservoir ports 324 direct flow to the interior of the spool valve 72. Flow then proceeds from the interior of the spool valve 72 to the reservoir ports 310. From the reservoir ports 310, flow exits the torque generator 11 through the outlet port 15.

Aspects of the present disclosure are also applicable to systems having flow metering arrangements different from the specific flow metering arrangement depicted and described herein. An example metering valve arrangement is disclosed at U.S. Pat. No. 4,936,094, which is hereby incorporated by reference in its entirety.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A torque generator comprising:
   a valve arrangement including a spool valve and a valve sleeve aligned along an axis of rotation, the spool valve including an input shaft, the valve sleeve being positioned over and co-axially aligned with the spool valve, wherein relative rotational movement between the valve sleeve and the spool valve about the axis of rotation allows the valve arrangement to move between a neutral state and an operating state;
   a gerotor displacement mechanism including a stator and a rotor, wherein when the valve arrangement is in the operating state, the valve arrangement is adapted to provide pressurized fluid to the gerotor displacement mechanism for driving the rotor relative to the stator;
   an output shaft coupled to the rotor;
   a torsion bar that extends axially through an interior of the spool valve along the axis of rotation;
   a first cross-shaft that rotationally fixes the torsion bar relative to the spool valve at a first axial portion of the torsion bar;
   a second cross-shaft that rotationally fixes the torsion bar relative to the valve sleeve at a second axial portion of the torsion bar, the first and second axial portions being axially spaced-apart from one another;
   the torsion bar being configured such that when the valve arrangement is moved toward the operating state by generating relative rotational movement between the spool valve and the valve sleeve, torque is applied to the torsion bar such that the torsion bar elastically twists about the axis of rotation causing a torsion load to be stored within the torsion bar between the first and second axial portions of the torsion bar, wherein the torsion load rotationally biases the valve arrangement toward the neutral state; and
   a torque driver that transfers torque from the rotor to the second cross-shaft for causing the valve sleeve to follow rotation of the spool valve when the valve arrangement is in the operating state,
   wherein an end of the spool valve is recessed relative to a corresponding end of the valve sleeve such that a non-overlapping region is defined at the end of the valve sleeve, wherein the second axial portion of the torsion bar is positioned at the non-overlapping region, and wherein the second cross-shaft engages the valve sleeve at the non-overlapping region, and
   wherein the torque driver includes a first end including a sleeve that receives the second axial portion of the torsion bar and a second end including splines that interface with corresponding splines of the rotor and, the sleeve defining openings for receiving the second cross-shaft, the openings being elongated in an axial direction to accommodate orbital movement of the torque driver caused by the rotor.

2. The torque generator of claim 1, wherein the stator includes rollers that engage the rotor.

3. The torque generator of claim 1, wherein the torsion bar includes first and second ends respectively defining first and second enlarged heads, wherein the first and second enlarged heads respectively include the first and second axial portions, and wherein the first cross-shaft extends through the first enlarged head and the second cross-shaft extends though the second enlarged head.

4. The torque generator of claim 3, wherein the first enlarged head fits within a pocket defined by the input shaft.

5. The torque generator of claim 4, wherein the first cross-shaft includes ends that fit within circumferentially oversized openings defined by the valve sleeve.

6. The torque generator of claim 1, wherein the stator includes a ring structure with internal projections, and wherein the rotor includes a star member with external teeth.

7. The torque generator of claim 5, further comprising a valve housing defining a main bore for receiving the spool valve and the valve sleeve, a motor housing for enclosing the gerotor displacement mechanism, an adapter plate mounted to the valve housing , and a port plate mounted between the adapter plate and the motor housing.

8. The torque generator of claim 7, wherein the adapter plate defines an opening for receiving the end of the valve sleeve, wherein the port plate defines an opening through which the torque driver extends, and wherein the opening of the adapter plate is larger than the opening of the port plate.

9. The torque generator of claim 8, wherein the port plate defines ports for providing the pressurized fluid from the valve arrangement to the gerotor displacement mechanism and for directing fluid from the gerotor displacement mechanism back to the valve arrangement, wherein the adapter plate defines ports in fluid communication with the ports of the port plate, the ports of the adapter plate being outwardly offset and overlapping with respect to the ports of the port plate.

10. A valve arrangement comprising:
a spool valve;
a valve sleeve positioned over the spool valve, wherein relative rotational movement between the valve sleeve and the spool valve allows the valve arrangement to move between a neutral state and an operating state;
a torsion bar for biasing the valve arrangement toward the neutral state, the torsion bar being rotationally coupled to the spool valve at a first axial portion of the torsion bar, the torsion bar being rotationally coupled to the valve sleeve at a second axial portion of the torsion bar, wherein when the valve arrangement is moved toward the operating state by generating relative rotational movement between the spool valve and the valve sleeve, torque is applied to the torsion bar such that the torsion bar elastically twists causing a torsion load to be stored within the torsion bar between the first and second axial portions of the torsion bar, wherein the torsion load rotationally biases the valve arrangement toward the neutral state; and
a first cross-shaft for rotationally coupling the torsion bar to the spool valve at the first axial portion of the torsion bar and a second cross-shaft for rotationally coupling the torsion bar to the valve sleeve at the second axial portion of the torsion bar,
wherein the first cross-shaft includes ends that fit within circumferentially oversized openings defined by the valve sleeve.

11. The valve arrangement of claim 10, wherein an end of the spool valve is recessed relative to a corresponding end of the valve sleeve such that a non-overlapping region is defined at the end of the valve sleeve, wherein the second axial portion of the torsion bar is positioned at the non-overlapping region, and wherein the second cross-shaft engages the valve sleeve at the non-overlapping region.

12. The valve arrangement of claim 11, further comprising a torque driver includes a first end including a sleeve that receives the second axial portion of the torsion bar and a second end driven by a rotor of a motor powered by hydraulic fluid routed though the valve arrangement when the valve arrangement is in the operating state, the sleeve defining openings for receiving the second cross-shaft.

13. The valve arrangement of claim 11, wherein the torsion bar includes first and second ends respectively defining first and second enlarged heads, wherein the first and second enlarged heads respectively include the first and second axial portions, and wherein the first cross-shaft extends through the first enlarged head and the second cross-shaft extends though the second enlarged head.

14. The valve arrangement of claim 13, wherein the first enlarged head fits within a pocket defined by an input shaft of the spool valve.

* * * * *